B. LOOMIS.
PROCESS OF RETTING AND UNGUMMING FIBER PLANTS.
APPLICATION FILED JULY 23, 1912.
Patented Aug. 3, 1915.
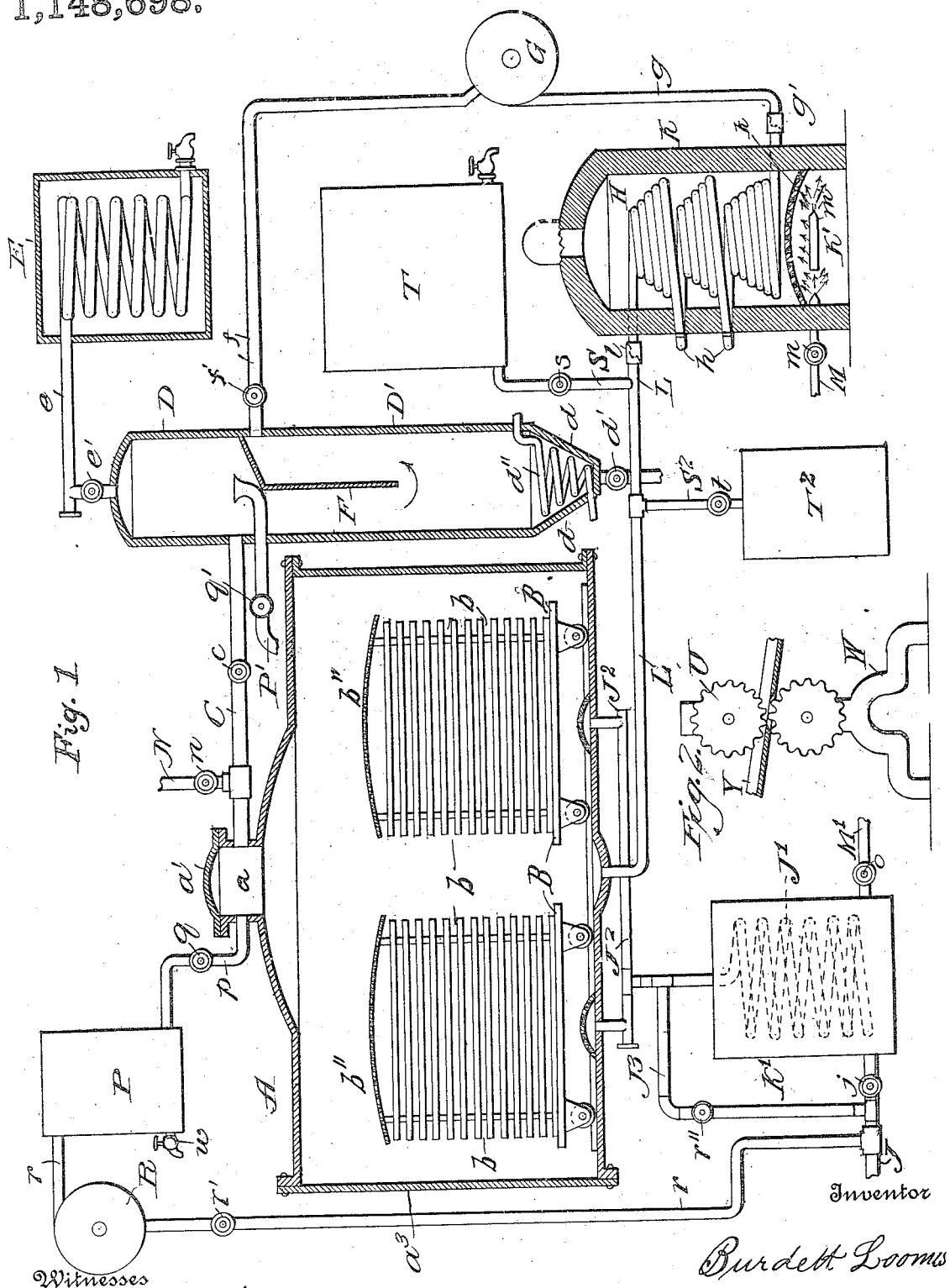

UNITED STATES PATENT OFFICE.

BURDETT LOOMIS, OF HARTFORD, CONNECTICUT, ASSIGNOR TO LOOMIS UTILIZATION COMPANY, OF EAST ORANGE, NEW JERSEY, A CORPORATION OF NEW JERSEY.

PROCESS OF RETTING AND UNGUMMING FIBER-PLANTS.

1,148,698.  Specification of Letters Patent.  Patented Aug. 3, 1915.

Application filed July 23, 1912. Serial No. 711,048.

*To all whom it may concern:*

Be it known that I, BURDETT LOOMIS, a citizen of the United States, residing at Hartford, in the county of Hartford and State of Connecticut, have invented certain new and useful Improvements in Processes of Retting and Ungumming Fiber-Plants, of which the following is a specification.

This invention relates to a process of retting flax, hemp and other fiber plants to prepare the plant material for separating the fiber from the bark and woody material.

The object of my invention is to provide for quickly retting fiber plants, such as flax, hemp, esparto grass, cane, etc., in a closed tank, by dissolving and extracting the gummy or waxy matter, oil, etc., by means of fatty acids and other solvents derived from the plant or from wood, and diffused in warm or hot water and circulated in contact with the plant material, at the same time floating off the extracted wax or gum with the circulating warm or hot water, and causing removal therefrom by skimming or by deposit in a separating chamber, and also repeatedly reheating the water or solvent liquor and circulating it through the plant material.

The retting process, as usually practised, is slow and laborious, and often irregular in action and uncertain in results, producing an indifferent, or an actually damaged product.

By my process I seek to expedite the process, to overcome the difficulties heretofore encountered, and produce a more uniform fiber product, of strong, soft quality and good color. Any tannic acid and coloring matter which may be present in the plant may be first extracted by circulating water for a short time at a low temperature—between 100° F. and 150° F.—through the body of plant material and then drawing off the watery extract.

By heating wood and plant material to a moderate temperature, ranging between 215° and 245° F., decomposition is set up, resulting in the formation of a number of acids of the fatty acid series, and by raising the temperature there are formed other fatty acids. The formation of fatty acids, among which acetic acid appears in largest quantity, commences, according to Gillot, at 255° F. Other fatty acids are formed, such as formic acid, butyric acid, valeric acid, etc., at the above and higher temperatures.

Simultaneously with the formation of these acids, carbonic acid, carbonic oxid and methane are evolved from the wood or plant material, and these bodies in a nascent state may act upon the acids so that the latter may undergo decomposition by more vigorous heating and a large number of products of decomposition may be formed. Among such products are found methyl alcohol (wood spirits) acetone and metacetone, methyl, acetic ether, aldehyde and dimethyl acetal.

I have discovered that these above mentioned fatty acids, gases and other products of decomposition, when diffused in hot water, are an excellent solvent for the cellular structure, the gummy, waxy or resinous materials found in wood and plants, and that, if the solvent mixture or solution is circulated in contact with the plant material to be treated the contained gummy, waxy or resinous matter will be quickly liberated and may be drawn off with the circulating solvent liquor. The volatile matter will pass off in the form of vapor and be condensed, and the waxy or resinous matter will pass off with the water in a semi-liquid condition and will be skimmed off or be deposited and recovered.

I have also discovered that the fatty acids and other solvents may be most effectively and economically produced and diffused in water by first heating fresh water and circulating it in contact with wood or plant material at gradually increasing temperature, ranging from 212° to approximately 300° F. The volatile solvent is readily extracted from the material and diffused in the water and the mixture is passed from the treating tank through a heater where the temperature is gradually raised and is then circulated up through the plant material. The circulation of the water and solvent in contact with the material and through the heater, the temperature being gradually increased, is continued till the solvent has liberated the wax and gummy matter, or other constituents, according to the kind of plants treated, and these products have been recovered. The treatment may be continued for six to twelve hours, according to the character of the plants and the temperature of the treating liquor.

The matter constituting my invention will be defined in the claims.

I will now describe my process in detail by reference to the accompanying drawing, in which:

Figure 1 represents a sectional elevation of one form of apparatus adapted for carrying out the process. Fig. 2 represents an end view of crushing rolls and a feed table in section.

In the apparatus I provide four principal parts or devices, consisting of a treating and extracting tank A, an expansion and depositing chamber D, $D^1$, heating coils H located in a furnace below the bottom of tank A, and a condenser E, these parts being suitably connected by valved pipes and a circulating pump being used in the connecting pipes. The treating tank A may be constructed of boiler iron or other suitable sheet metal, and has at the top a mouthpiece $a$ provided with a cover $a'$, and at the bottom a pair of rails $a''$.

For receiving the flax straw or other fiber plant I provide wheeled cars or trucks B having racks $b$ containing grids, one above another and a perforated top plate $b''$ made of sheet metal or strong wire cloth. Rails $a''$ are placed on the bottom of the tank and space may be provided for two or more cars and racks for holding layers of the fiber plants.

To the mouthpiece $a$ is connected a water and vapor discharge pipe C, having a valve $c$, which connects with an expansion and depositing chamber D, $D^1$, at the top of which connects a vapor discharge pipe $e$, having a valve $e'$. The pipe $e$ leads to a condenser E.

The expansion and depositing chamber D, $D^1$ rises above the tank A and is about one-half the diameter of said tank, though such exact proportions are not required. This chamber is made with a tapering lower end $d$, terminating with a discharge pipe having a valve $d'$ for drawing off resinous or gummy material. A steam coil $d''$ is placed in the lower end of chamber $D^1$ for melting resinous or gummy material in case it becomes cold and hardened. At about the middle height of chamber D, $D^1$, is placed a separating dome or hood F, which may be attached at its edges to the wall of the chamber, as shown, and an outlet pipe $f$ connects with the wall of chamber $D^1$ at the top of the dome and is provided with a valve $f'$. The dome is located below the connection of the water and vapor discharge pipe C from treating tank A and provides a vapor expansion chamber or space D above it, and a depositing or catch-all chamber or space $D^1$ below it. This dome acts as a deflector and separator to cause the waxy or gummy matter to be deposited in the bottom of chamber $D^1$ while the water or treating liquor flows up into the dome and thence off to the circulating pump G. A positively acting rotary pressure pump is preferably used, though some other kind of positive pressure pump may be employed. A discharge pipe $g$ connects with the pump and leads to the lower end of a series of heating coils H suitably supported in a furnace K. Three coils are connected in a series by means of return bends $h$ which extend through the wall of the furnace. Near the bottom of the furnace is provided a perforated arch $k$ for distributing the gas flame and protecting the lower heating coil. A fire chamber is provided below the arch $k$. Gas is preferably burned in the fire chamber and is supplied by a pipe M having a valve $m$ and a burner of any suitable kind $m'$ in the fire chamber.

In order to secure satisfactory heating and circulation of liquid through the apparatus, the heater is located so that the top thereof is below the bottom of the treating tank A.

To the top of the heating coil is connected a return pipe L of the circulating system, and this pipe is also connected to the bottom of the treating tank A. The return pipe L is provided with a check valve $l$ and a union coupling $l'$. A check valve $g'$ is also placed in the lower end of pipe $g$ at its connection with the coil. These check valves prevent back flow of water or solvent liquor from the tank. To pipe L is connected a blow-off pipe S, having a valve $s$, and connecting with a storage and settling tank T.

A second storage tank $T^2$ to which pipe L is connected by a pipe $S^2$ having a valve $t$, is provided for receiving tannic acid or other extract or solution. A water-supply pipe N, having a valve $n$, connects with pipe C near the mouthpiece of tank A, or may connect at other desired part of the apparatus, as near the heating coils.

In case plant material, containing tannic acid is being treated, the acid will be extracted and stored in tank $T^2$.

A second heating furnace $K^1$, containing a coil $J^1$, is used for heating gas to be used in drying the plant material after treatment with hot water and solvent solution. A pipe J, having a valve $j$, leads from a gas holder, and connects with the coil $J^1$, and a pipe $J^2$ leads from top of the coil and connects by two branches with the bottom of tank A. A return pipe $p$, having a valve $q$ leads from the top of tank A, preferably at the mouthpiece $a$ to the condenser P.

A return pipe $r$ connects the top of the condenser with a rotary exhauster R and a pipe $r$ thence leads to the pipe J connecting with the heating coil $J^1$, whereby the condensable matter may be removed from the gas, and the noncondensable gas, then returned to be reheated. The products of condensation may be drawn off from the condenser by faucet $w$. A gas pipe $M^1$, having a valve $o$, supplies gas to a burner in furnace $K^1$ for heating the coil $J^1$.

In operating the apparatus for carrying out my process, the plant material is placed in layers on the grids in the racks and held in place by any suitable means, and the trucks are rolled into the tank, the end door $a^3$ being open for the purpose. The door is then closed and secured by bolts. Now, the system, including tank A, chamber D, $D^1$, and the coils H, is filled with water, admitted by pipe N and caused to rise to the level of the discharge pipe C. Gas is then ignited at the burner $m'$, and the circulating pump G is started. This causes circulation of water through the heating coils and thence up through the treating tank A in contact with the fiber material. I may first proceed to extract and remove tannic acid and coloring matter from the fiber material by circulating water at a temperature between 100° F. and 150° F. through the body of material in the tank. Circulation of water at this low temperature is continued till all, or most, of the tannic acid and coloring matter have been extracted, then the acid solution is drawn off into a tank $T^2$ by opening valve $t$ in pipe $S^2$.

The system is again filled with water and pump G put in operation and the heat increased in the furnace K. As the circulating water becomes heated, approximately to 212° F., some of the fatty acids are produced and pass with the water into the heating coils. As the temperature of the water is gradually raised, other fatty acids, gases and products of decomposition are formed and diffuses through the water. The hot circulating water and the solvent fatty acids soon commence to dissolve the cellular structure and release the volatile matter and wax or gum from the plant material. The vapor, gum and wax pass with the water or liquor into chamber D, $D^1$, where the volatile vapors separate and fill the vapor space D from which they pass off through pipe $e$ to the condenser E, where condensation is effected. At the same time the circulating water containing resinous or gummy matter which has been released from the plant material is passed down over the separating dome F, where such matter is separated and caused to settle into the depositing chamber $D^1$, where it collects, while the water passes up through the separating dome F, and thence by pipe $f$, the circulating pump G, and pipe $g$ into the bottom of the heating coils. By circulating the hot water or solvent liquor up through the fiber material in tank A, the wax and gummy matter are carried upward and floated off with the water through pipe C into chamber D, $D^1$, where they are deposited.

The circulating hot water or solvent liquor in tank A agitates the body of material and prevents packing, and continuously carries away the extracted wax and gummy matter so as to continuously bring fresh liquor into contact with the material to effectively exert its solvent action on the cellular structure thereof and release the wax or gummy and resinous constituents. In the expansion and depositing chamber D, $D^1$, the volatile matter and the wax or gum readily separates from the liquor, and at the same time the liquor is partially cooled so that the wax or gum is hardened and will readily settle in the bottom of chamber $D^1$. The velocity of the flow of liquor is much retarded in this chamber, thereby facilitating the deposit of gum. This action is also aided by the small overflow outlet pipe $f$ from the top of the separating dome F.

The temperature of the water or liquor may be gradually raised in the heating coils to approximately 300° F. As the operation progresses and the heat is increased, the water or liquor becomes charged with an increasing percentage of fatty acids, gases, etc., and these act with increasing energy to dissolve, release and extract the oil, wax, resinous or gummy matter from the material till it is substantially free from such constituents. The operation may be continued for a period varying from six to twelve hours, according to the character of fiber material treated.

The fatty acid solvent solution used in retting fiber plants may be prepared from any suitable hard wood and diffused in water for obtaining a good solvent for the wax, gum and resinous matter in the plant. The solvent liquor thus previously prepared may be used at a lower temperature, 100° to 200° F. in treating fiber plants to avoid injury to the fiber, where the greatest strength is required.

At suitable intervals, the valve $d'$ may be opened and the resin or gum discharged from the chamber $D^1$, but this may be mostly discharged at the end of the operation. In case oil is extracted from the plant material it may be drawn off from the top of liquor in chamber D by opening valve $q$ in pipe P.

When the treatment and extraction of wax, gum and oil in tank A is completed, the valve $c$ may be closed and the blow-off valve $s$ opened, permitting the liquor containing the fatty acid and any remaining oil to be blown off into the storage and settling tank T, where it is reserved for treating a succeeding charge of plant material in tank A.

The flax or other fiber material may now be dried by warm gas. For this purpose producer gas, or wood gas is admitted by pipe J to the coil J¹, and the gas ignited at the burner. The warm gas is passed from the coils up into the tank and distributed around and between the trays containing layers of fiber material. The moisture will be taken up by the warm gas and passed off with it through pipe p, valve q being open, to the condenser P, where the moisture will be condensed, while the non-condensable gas will be drawn off by the exhauster R, and returned through pipe r to pipe J leading to the heating coil, where it is reheated and again circulated through tank A. Circulation is thus continued till the material is sufficiently dried. Air, instead of gas, may be passed through the heating coil J¹ if desired, and if found better adapted for drying certain fiber material; and after condensation of moisture may be forced by the exhauster R repeatedly through the heater and tank A. The temperature of the circulated gas or air may range from 100° F. to 200° F. or higher, if the fiber material is of such a character that it will not be injured by a high temperature. The warm gas or air passes rapidly over the material, and the moist vapors rising from it prevent a rise of temperature and prevent overheating.

Circulation of warm gas will usually be preferable, as the gas (composed principally of hydrogen and carbon monoxid) is non-oxidizing, and therefore will not discolor the fiber material. By closing valve j and opening valve r″ in by-pass pipe J³ cool gas may be passed from the holder directly through the tank A for cooling the charge of fiber material before opening the door a³ and removing the cars B. By use of the pipe J³ gas may also be circulated repeatedly through the tank, the condenser and exhaust pump R, without passing through the heater, till the material is sufficiently dry and cool to be removed from the tank.

Before the fiber plant material, such as henequen, hemp, cane, broom corn, banana, kelp, etc., is placed in the treating tank A it is, preferably, crushed by passing it between plain or fluted rollers U mounted in a frame w and having a feed table Y as shown in Fig. 2. The crushing rolls will be adapted in size and exterior surface to the kind of fiber plant to be crushed.

The juice pressed from broom corn, banana, henequen plant and other like juicy plants will, preferably, be used in the retting and extracting operation in tank A, instead of starting with clear water. The expressed juice may also be mixed with any fatty acid or other solvent solution in tank A.

Flax, hard-stalked grasses and other hard fiber material may be subjected in the usual manner to a breaking machine and to a scutching machine or mill after treatment and drying in tank A, for removing bark or chives, in case it is desired to separate the more valuable fiber for use in making cordage or textile fabric. The coarse woody material may be separately treated for making cellulose.

Having described my invention, what I claim and desire to secure by Letters Patent is:

1. The process of retting fiber plants, which consists in crushing the fiber material and squeezing out the contained juice, heating the extracted juice and circulating it in contact with the fiber material, thereby releasing and extracting gummy and resinous matter, floating off and removing such matter, reheating the extracting liquor and repeatedly circulating it in contact with the fiber material till retting and ungumming are effected.

2. The process of retting fiber plants, which consists in crushing the fiber material and squeezing out the contained juice, heating the extracted juice and circulating it, together with fatty acid solvent liquor, in contact with the fiber-material, thereby releasing and extracting gummy and resinous matter, floating off and removing such matter, reheating the extracting liquor and repeatedly circulating it in contact with the fiber material till retting and ungumming are effected.

3. The process of retting fiber plants, which consists in crushing and expressing the juice, then extracting tannic acid from the material by means of warm water, drawing off the tannic acid solution, then heating the expressed juice and fatty acid solvent and circulating the mixture in contact with the material and through a heater for releasing the gummy and resinous matter, floating off and removing such matter, reheating the extracting liquor and continuing the treatment till retting and ungumming are effected, then drawing off the liquor and drying the material by circulating through it warm nonoxidizing gas.

In testimony whereof I affix my signature in presence of two witnesses.

BURDETT LOOMIS.

Witnesses:
W. A. SANBORN,
J. L. CROWLEY.